United States Patent [19]

Gardano et al.

[11] Patent Number: 5,599,514
[45] Date of Patent: Feb. 4, 1997

[54] PROCESS FOR RECOVERING COBALT AND TUNGSTEN FROM REACTION LIQUORS

[75] Inventors: Andrea Gardano, Trino; Sauro Strologo; Marco Foa', both of Novara, all of Italy

[73] Assignee: Novaol S.R.L., Ravenna, Italy

[21] Appl. No.: 384,427

[22] Filed: Feb. 6, 1995

[30] Foreign Application Priority Data

Feb. 7, 1994 [IT] Italy .................. MI94A0211

[51] Int. Cl.⁶ .............. C01G 41/00; C01G 51/00
[52] U.S. Cl. .............. 423/55; 423/58; 423/140; 423/606
[58] Field of Search ............... 423/55, 144, 58, 423/606, 140

[56] References Cited

U.S. PATENT DOCUMENTS

| | | | |
|---|---|---|---|
| 1,293,403 | 2/1919 | Giles et al. | 423/58 |
| 3,887,680 | 6/1975 | MacInnis et al. | 423/58 |
| 3,953,194 | 4/1976 | Hartline, III et al. | 423/440 |
| 3,969,484 | 7/1976 | Onozaki et al. | 423/55 |
| 4,256,708 | 3/1981 | Quatrini | 423/53 |
| 4,629,503 | 12/1986 | Fruchter et al. | 423/53 |
| 4,668,483 | 5/1987 | Ladd et al. | 423/53 |
| 4,910,175 | 3/1990 | Michel et al. | 502/24 |
| 4,954,466 | 9/1990 | Weisenfeld | 423/139 |

FOREIGN PATENT DOCUMENTS

| | | | |
|---|---|---|---|
| 503615 | 6/1954 | Canada | 423/58 |
| 477450 | 4/1992 | European Pat. Off. . | |
| 839838 | 6/1960 | United Kingdom | 423/144 |
| WO94/10122 | 5/1994 | WIPO . | |

OTHER PUBLICATIONS

Derwent Abstract U.S. Patent Application 443,281, filed Nov. 30, 1989.
Derwent Abstract EP Application 447,540, filed Dec. 21, 1990, published Apr. 1, 1992.
Derwent Abstract JP Patent Application 02-217321, published Aug. 30, 1990.
Derwent Abstract PCT/EP93/2944, International Application Aug. 17, 1994.
Derwent Abstract JP Patent Application 54 040 213, published Feb. 29, 1979.

*Primary Examiner*—Steven Bos
*Attorney, Agent, or Firm*—Bryan Cave L.L.P.

[57] ABSTRACT

Process for recovering and re-using cobalt and tungsten from reaction liquors, in which said reaction liquors are treated:

a) With an alkali-earth metal hydroxide in order to precipitate cobalt and tungsten, and the resulting precipitate is subsequently treated with a strong mineral acid in order to be able to dissolve the cobalt salt and separate it from $H_2WO_4$ precipitate; or b) With an alkali metal hydroxide in order to precipitate and separate $Co(OH)_2$, and the resulting alkaline solution is then treated with an alkali-earth metal compound which is filtered and treated with a strong mineral acid in order to obtain $H_2WO_4$

24 Claims, No Drawings

PROCESS FOR RECOVERING COBALT AND TUNGSTEN FROM REACTION LIQUORS

FIELD OF THE INVENTION

The present invention relates to a process for recovering and re-using cobalt and tungsten from reaction liquors.

In particular, the present invention relates to a process for recovering and re-using cobalt and tungsten from reaction liquors coming from the oxidative cleavage of unsaturated fatty acids or their esters.

In international patent application PCT/EP93/2944, a process is disclosed for preparing carboxy acids or their esters by means of the oxidative cleavage of unsaturated fatty acids or their esters. This process comprises the following two steps:
(a) preparing the vicinal diols by reaction with hydrogen peroxide, preferably in the presence of tungstic acid, and
(b) reaction of the so obtained diols in an aqueous medium with either oxygen gas or an oxygen containing gas, in the presence of salts of divalent cobalt.

The reaction liquors resulting from this process contain all of the used catalysts, i.e., tungstic acid and the cobalt salt. (The recovery of said catalysts provides environmental advantages simple disposal of the reaction liquors into the environment would cause pollution owing to cobalt toxicity), and economic advantages, (owing to the high price of the catalysts).

Re-using the reaction liquors as such in reaction step (b) is not possible owing to the following reasons:
(a) a continuous increase of the tungsten level would occur in the reaction liquors, in the form of tungstic acid or its derivatives, with unpredictable effects on the reaction; and
(b) a continuous increase in the volume of the aqueous phase would occur due to the effect of water added with hydrogen peroxide in the preparation of the vicinal diols.

DESCRIPTION OF THE PRIOR ART

Processes are known for recovering cobalt or tungsten from tungsten carbide agglomerates (U.S. Pat. No. 3,953,194, U.S. Pat. No. 2,567,08, U.S. Pat. No. 4,629,503) and from the oxidative cleavage reaction mixture (EP-A-477450, JP-A-02217321, U.S. Pat. No. 4,954,466, U.S. Pat. No. 4,910,175), but processes for simultaneously recovering cobalt and tungsten from the reaction liquors are not known. The processes known from the prior art are the following.

U.S. Pat. No. 3,953,194 relates to a process for recovering tungsten from tungsten carbide agglomerates. The disintegration of the agglomerates takes place by means of the complete oxidation of metal carbide with oxygen and an excess of alkali metal hydroxide solution. The obtained water soluble tungsten salt is separated from the residue which contains the other metal values. Tungsten impurity is removed in an intermediate step in which an ammino tungsten salt is formed.

U.S. Pat. No. 4,256,708 discloses a process similar to that disclosed by U.S. Pat. No. 3,953,194, except with the difference that the treatment with the alkali metal hydroxide takes place in the presence of titanium oxide which is combined with the cobalt contained in the carbide. Tungsten is recovered as alkali metal tungstate.

U.S. Pat. No. 4,629,503 relates to a process for high temperature tungsten recovery (680°–750° C.), using sodium nitrate or sodium nitrite fluxes. The resulting sodium tungstate, obtained as a water solution, is treated with a calcium chloride solution in order to precipitate calcium tungstate which is then transformed with concentrated hydrochloric acid into tungstic acid. The recovery of pure tungsten requires a last step in which tungstic acid is fired and then deoxidized. The parameters of such a process are critical, because one must prevent tungsten from absorbing other elements.

U.S. Pat. No. 443281 discloses the precipitation of $Co^{2+}$ with an alkali metal hydroxide or carbonate. U.S. Pat. No. 4,910,175 discloses the recovery of cobalt and manganese from mother liquors containing acetic acid, with oxalic acid and alkali metal hydroxide. The precipitated product is dispersed in an aqueous solution of acetic acid. EP-A-477450 relates to tungsten recovery from exhausted catalysts by boiling them in an aqueous solution of sodium hydroxide.

From the prior art, the problem emerges of addressing the simultaneous recovery and re-use of cobalt and tungsten from reaction liquors.

The purpose of the present invention therefore is of recovering and re-using cobalt and tungsten from reaction liquors, in particular from the reaction liquors coming from the oxidative cleavage of unsaturated fatty acids, or their esters. Cobalt separation must be total, because the presence of even traces of cobalt in the recovered tungstic acid will render said tungstic acid unsuitable for being re-used in said oxidative process because cobalt induces the catalytic decomposition of hydrogen peroxide used in reaction step (a) of the process for oxidative cleavage of unsaturated fatty acids.

SUMMARY OF THE INVENTION

Such a purpose is achieved, according to the present invention, by means of a process for recovering and re-using cobalt and tungsten from the reaction liquors, characterized in that said liquors are treated
(a) with an alkali-earth metal hydroxide in order to precipitate cobalt and tungsten as cobalt salts and tungsten salts, and the precipitate is then treated with a strong mineral acid in order to dissolve the cobalt salt and separate it from the precipitated tungstic acid; or
(b) with an alkali-metal hydroxide in order to precipitate and separate cobalt oxide/hydroxide, and the resulting alkali-metal solution is then treated with a compound of an alkali-earth metal in order to precipitate an alkali-earth metal tungstate which is filtered off and treated with a strong mineral acid to obtain tungstic acid.

DESCRIPTION OF THE PREFERRED EMBODIMENTS

Cobalt oxide/hydroxide and tungstic acid, recovered as solids, can be used again as such in the oxidative cleavage process, whilst the cobalt salt dissolved in the acid liquors according to embodiment (a) is re-used after the neutralization of the acidic liquors.

The pH value of the reaction liquors treated with said alkali-earth metal or alkali-metal hydroxide according to embodiment (a) or (b), respectively, of the process, should be preferably comprised within the range of from 9 to 14, and more preferably of from 10 to 13.

The separation of the precipitated products is preferably carried out by filtration or centrifugation.

The molar ratio of said alkali-earth metal hydroxide to $Co^{2+}$ in the embodiment (a) of the process is preferably comprised within the range of from 4 to 30, and more preferably of from 5 to 20.

In the embodiment (a) of the process, the molar ratio of said alkali-earth metal hydroxide to tungsten is preferably comprised within the range of from 5 to 20, and more preferably of from 8 to 15.

In the embodiment (a) of the process the molar ratio of $Co^{2+}$ or tungsten to the strong mineral acid is not critical, however the amount, as equivalents, of the strong mineral acid should be at least twice as large as the amount, in moles, of said alkali-earth metal hydroxide.

In the embodiment (b) of the process, the molar ratio of the alkali-metal hydroxide to $Co^{2+}$ is preferably comprised within the range of from 4 to 20, and more preferably of from 5 to 15.

In the embodiment (b) of the process, the molar ratio of said alkali-metal hydroxide to the tungsten compound is preferably comprised within the range of from 5 to 20, and more preferably of from 8 to 15.

The molar ratio of said alkali-earth metal compound to the tungsten compound, in the embodiment (b) of the process, is preferably comprised within the range of from 1 to 20, and more preferably of from 2 to 15.

The molar ratio of the tungsten compound to said strong mineral acid in the embodiment (b) of the process is not critical, however the amount, as equivalents, of the strong mineral acid should be at least twice as large as the amount, in moles, of the tungsten compound.

In the embodiment (a) of the process, said alkali-earth metal hydroxide preferably is calcium hydroxide.

In the embodiment (b) of the process, said alkali-metal hydroxide preferably is sodium hydroxide, and the compound of an alkali earth metal preferably is an alkali-earth metal salt, and more preferably, calcium hydroxide, or a calcium salt.

Some of calcium salts which can be used according to the embodiment (b) of the process according to the present invention are: calcium acetate, calcium chloride, calcium nitrate.

According to the present invention, the following mineral acids are preferably used: hydrochloric acid, sulfuric acid, nitric acid and perchloric acid. In the process, their concentration can be preferably comprised within the range of from 0.5N to 12N, more preferably of from 1N to 6N.

According to a preferred modified embodiment of the process, the reaction liquors resulting from the oxidative cracking of unsaturated fatty acids of their esters are treated with calcium hydroxide to achieve a pH value of 12/13 in order to completely precipitate cobalt and tungsten ($\leq$2–9 ppm of Co and W). The precipitated product is separated and submitted to a high temperature treatment with 6N hydrochloric acid. Tungstic acid precipitates and is separated from the acidic solution and, after water washing, is recycled to the oxidation process. The acidic liquors, combined with the tungstic acid wash liquors, contain all cobalt dissolved as $CoCl_2$. They are neutralized and recycled to the oxidative cleavage process.

According to another preferred modified embodiment of the process according to the present invention, the cobalt- and tungsten-containing reaction liquors are treated with sodium hydroxide until a pH value of 12/13 is obtained. Cobalt is thus precipitated as $Co(OH)_2$, which is separated and recycled to the reaction of oxidative cleavage of unsaturated fatty acids and their esters. The resulting basic aqueous liquors contain dissolved tungstate as $Na_2WO_4$. They are treated with an excess of a soluble calcium salt (e.g., calcium chloride or acetate) or calcium hydroxide, so as to precipitate calcium tungstate ($CaWO_4$), which is separated and submitted to a high-temperature treatment with 6N hydrochloric acid in order to obtain tungstic acid which can be recycled to the oxidative cracking reaction.

The process makes it possible to completely recover cobalt and tungsten in a re-useable, separated form.

The following, non-limitative examples illustrate the present invention and facilitate the understanding thereof.

EXAMPLE 1

(Obtainment of reaction liquors)

To a flask of 500 ml of capacity, equipped with mechanical stirrer, thermometer, dropping funnel and reflux condenser, 100 g of raw oleic acid (purity=80%) containing 9% of linoleic acid and 0.75 g of tungstic acid, was charged.

With stirring, the resulting mixture was heated up to 55°–60° C. and to it 28 g of hydrogen peroxide at 60% w/w (by weight/weight) was added to it, in order to obtain vicinal diols. The addition of hydrogen peroxide was carried out gradually during approximately 30 minutes, so as to keep the temperature comprised within the range of from 55° to 60° C. When hydrogen peroxide addition was complete, the mixture was kept standing at the above temperature, for a further 7 hours. The resulting raw reaction mixture was charged to a stirred autoclave of 1000 ml of capacity, containing 300 ml of water and 1.2 g of cobalt acetate hydrate.

The autoclave was pressurized with air up to the pressure of 70 atm, and the temperature was increased up to 66° C. The reaction mixture was kept stirred at that temperature for 5 hours, then was cooled down to 50° C. and the aqueous layer was separated from the organic layer. The aqueous phase was cooled down to room temperature and precipitated azelaic acid was filtered off. The filtration water was used to separate and recover the catalyst system.

The organic phase was extracted a several times with water at 90° C. in order to separate azelaic acid. By cooling, 38.1 g of azelaic acid was recovered. The residual organic phase was fractionated by vacuum distillation (10 mmHg), recovering 31.3 g of pelargonic. The distillation residue was saponified with aqueous NaOH at 90° C. for 1 hour. After acidification, 7 g of azelaic acid and 2.5 g of pelargonic acid were separated by operating according to as indicated above. The total yield was 75% in azelaic acid and 75.4% in pelargonic acid.

EXAMPLE 2

The mother liquors coming from the process of the Example 1, containing 1.2 g (4.8 mM) of cobalt acetate and 0.75 g (3 mM) of tungstic acid, were treated with 2 g (27 mM) of calcium hydroxide. The solution was heated up to 50°–60° C. and was kept at that temperature for approximately 15 minutes. The greenish brown precipitate formed was separated by vacuum filtration. X-ray fluorescence analysis carried out on alkaline filtration aqueous liquors showed that cobalt and tungsten were practically absent (less than 10 ppm).

The precipitate was subsequently redissolved in 15 ml of 6N hydrochloric acid and the resulting acidic solution was heated up to 90° C. and was kept at that temperature for 1 hour. After cooling down to room temperature and dilution with 10 ml of water, a yellow precipitate of tungstic acid was obtained, which was filtered and washed three times, each time with 5 ml of water. The precipitate was oven dried to constant weight 0.71 g of tungstic acid (95% of total tungstic acid) was recovered.

The acidic solution and the wash waters were combined. The analysis of the resulting liquors showed that they contained all used cobalt and the remaining tungsten in solution.

Before being used again, their pH value was adjusted at pH 7–8 by means of the addition of calcium hydroxide.

The recovered catalytic system was used for the oxidative cleavage of oleic acid, operating according to the modalities as disclosed in Example 1.

The preparation of vicinal diols was carried out by using 0.71 g of recovered tungstic acid and 0.04 g of fresh tungstic acid added, in order to obtain the diols, as indicated in Example 1.

The thus prepared diols was reacted in autoclave, operating according to Example 1, using, as catalyst, the cobalt from the recovered solution. The yields in azelaic and pelargonic acids as reported in Example 1 were obtained.

If the mother liquors of this second preparation are submitted to the tungsten and cobalt separation and recovery procedure as disclosed above, 0.74 g of tungstic acid and an aqueous solution containing all the cobalt are obtained. This catalytic system can be used again in an oxidative cleavage process.

EXAMPLE 3

The mother liquors from the process of Example 1, containing 1 g ( 4 mM) of tungstic acid and 0.6 g ( 2.4 mM) of cobalt acetate were treated with 3 g (40 mM) of calcium hydroxide according to such modalities as disclosed in Example 2.

The precipitation and separation of cobalt and tungsten was carried out according to such modalities as of Example 2. After precipitate filtering off, X-ray fluorescence analysis of filtration liquors showed that cobalt content was lower than 1 ppm, and tungsten content was of 5 ppm.

EXAMPLE 4

The mother liquors from the process of Example 1, containing 1.2 g of cobalt acetate and 0.75 g of tungstic acid, were admixed with an aqueous solution at 40% of sodium hydroxide (30 mM, as computed at 100%), in order to obtain a pH value=13. The basic suspension was heated up to 50°–60° C. and was kept at that temperature for 40 minutes. Under these conditions, cobalt precipitated as a mixture of cobalt oxide/hydroxide, easily filterable or centrifugeable. The suspension was centrifuged and the resulting solid material was washed three times, each time with 10 ml of warm water. The resulting solid was used as such for a subsequent oxidation.

The basic solution obtained from cobalt hydroxide/oxide separation was combined with the wash liquors. To the separation liquors, 1.2 g (6.8 mM) of calcium acetate hydrate was added. The solution was heated up to 60° C. and was kept at that temperature for 30 minutes and was then cooled down to room temperature; under these conditions, tungsten precipitated completely.

The precipitate was filtered off, washed and oven-dried, with 0.86 g of calcium tungstate being obtained. Tungstic acid was obtained from calcium tungstate by operating according to the same modalities as disclosed in Example 2, by treatment with 5 ml of 6N hydrochloric acid. The process was carried out according to Example 2 above. Tungstic acid recovered by filtration corresponded to 95% of total. The tungstic acid remaining in the acidic solution could be recovered by adding to the acidic solution 2.5 g of calcium hydroxide, such as to adjust the pH value at pH=9–10.

By operating according to Example 1 above, the oxidative cleavage of oleic acid was repeated by using the recovered catalytic system, i.e., tungstic acid and mixed cobalt oxide/hydroxide to prepare the vicinal diol and oxidize it. The yields in pelargonic and azelaic acids corresponded to those obtained according to Example 1.

We claim:

1. A process for recovering cobalt and tungsten from reaction liquors containing same, the process comprising the steps of:

(a) (i) adding an alkali-earth metal hydroxide to the reaction liquors to precipitate the cobalt and tungsten as a, cobalt salt and a tungsten salt, (ii) separating the precipitate, (iii) adding a strong mineral acid to the precipitate to dissolve the cobalt salt and the tungsten salt and (iv) precipitating tungstic acid from the solution formed in step (a) (iii) or (b) (i) adding an alkali metal hydroxide to the reaction liquor to produce an alkali metal solution and a precipitate selected from the group consisting of cobalt oxide, cobalt hydroxide, and mixtures thereof, (ii) separating the precipitate from the alkali metal solution, (iii) adding an alkali-earth metal compound to the alkali metal solution to precipitate an alkali-earth metal tungstate; (iv) separating the alkali-earth metal tungstate from the alkali metal solution, and (v) adding a strong mineral acid to the alkali earth metal tungstate to obtain tungstic acid.

2. The process of claim 1, wherein the pH of the reaction liquors is comprised within the range of from 9 to 14.

3. The process according to claim 2, wherein the pH of the reaction liquors is comprised within the range of from 10 to 13.

4. The process of claim 1, wherein, in step (a) (i), the molar ratio of the alkali-earth metal hydroxide to cobalt is comprised within the range of from 4 to 30.

5. The process of claim 4, wherein the molar ratio of the alkali-earth metal hydroxide to cobalt is comprised within the range of from 5 to 20.

6. The process of claim 1, wherein, in step (a) (i), the molar ratio of the alkali-earth metal hydroxide to tungsten is comprised within the range of from 5 to 20.

7. The process of claim 6, wherein the molar ratio of the alkali-earth metal hydroxide to tungsten is comprised within the range of from 8 to 15.

8. The process of claim 1, wherein, in step (a) (ii), the amount of mineral acid used, as equivalents, is at least twice as large as the amount, in moles, of the alkali-earth metal hydroxide.

9. The process of claim 1, wherein, in step (b) (i), the molar ratio of the alkali metal hydroxide to cobalt is comprised within the range of from 4 to 20.

10. The process of claim 9, wherein the molar ratio of the alkali metal hydroxide to cobalt is comprised within the range of from 5 to 15.

11. The process of claim 1, wherein, in step (b) (i), the molar ratio of the alkali metal hydroxide to tungsten is comprised within the range of from 5 to 20.

12. The process of claim 11, wherein the molar ratio of the alkali metal hydroxide to tungsten is comprised within the range of from 8 to 15.

13. The process of claim 1, wherein, in step (b) (iii), the molar ratio of the alkali-earth metal compound to the tungsten is comprised within the range of from 1 to 20.

14. The process of claim 13, wherein the molar ratio of the alkali metal earth compound to the tungsten is comprised within the range of from 2 to 15.

15. The process of claim 1, wherein, in step (b) (v), the amount, as equivalents, of the strong mineral acid is at least twice as large as the amount, in moles, of the tungsten.

16. The process of claim 1, wherein, in step (a) (i), the alkali-earth metal hydroxide is calcium hydroxide.

17. The process of claim 1, wherein, in step (b) (i), the alkali metal hydroxide is sodium hydroxide.

18. The process of claim 1, wherein, in step (b) (iii), the alkali-earth metal compound is an alkali earth metal salt.

19. The process of claim 18, wherein the alkali-earth metal salt is a calcium salt.

20. The process of claim 19, wherein the calcium salt is selected from the group consisting of calcium acetate, calcium chloride, and calcium nitrate.

21. The process of claim 1, wherein, in step (b) (iii), the alkali-earth metal compound is calcium hydroxide.

22. The process according to claim 1, wherein the strong mineral acid is selected from the group consisting of hydrochloric acid, sulfuric acid, nitric acid, and perchloric acid.

23. The process according to claim 22, wherein the concentration of the strong mineral acid is comprised within the range of from 0.5N to 12N.

24. The process according to claim 23, wherein the concentration of the strong mineral acid is comprised within the range of from 1N to 6N.

* * * * *